Figure 1:
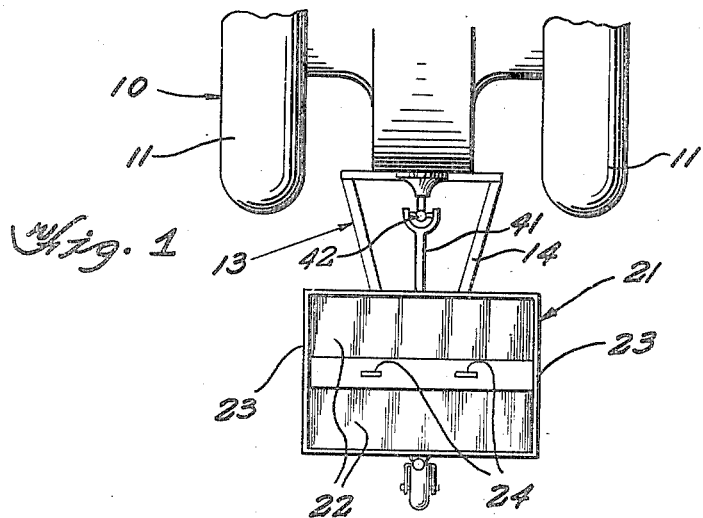

Jan. 31, 1950 W. V. HURT 2,496,162
SEEDER ATTACHMENT FOR TRACTORS
Filed Jan. 21, 1946 2 Sheets-Sheet 1

Inventor
WILLIAM V. HURT

By Clarence A. O'Brien
and Harvey B. Jacobson
Attorneys

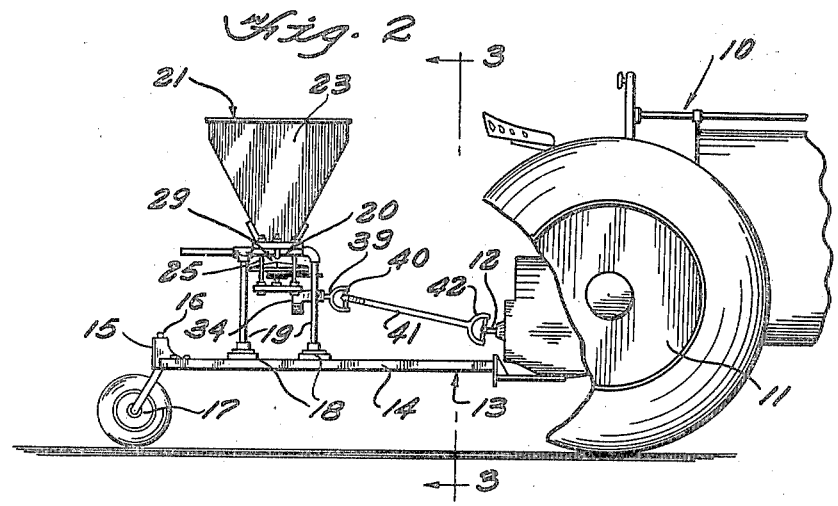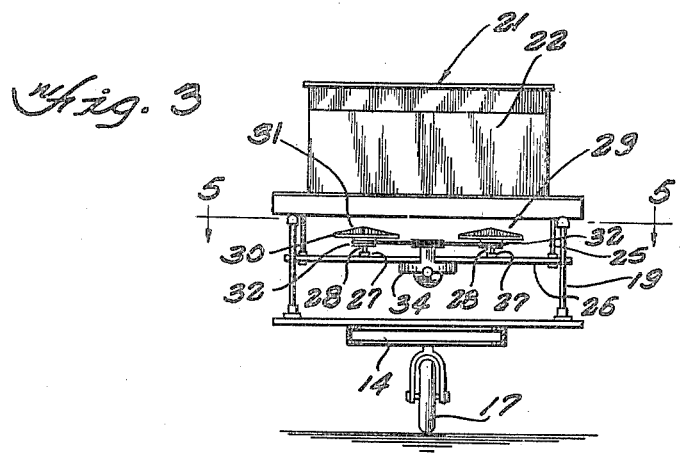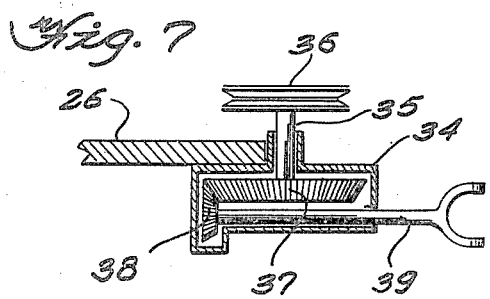

Patented Jan. 31, 1950

2,496,162

UNITED STATES PATENT OFFICE 2,496,162

SEEDER ATTACHMENT FOR TRACTORS

William V. Hurt, Monrovia, Ind.

Application January 21, 1946, Serial No. 642,567

2 Claims. (Cl. 275—8)

This invention relates to a seeder attachment for a tractor and its primary object is to broadcast seed as the tractor advances along a given path.

Another object of the invention is to utilize the power take-off of the tractor for driving the seed broadcasting equipment.

The above and other objects may be attained by employing this invention which embodies among its features a frame adapted to be attached to a tractor, a caster wheel supporting the rear end of the frame, a hopper supported by the frame, said hopper having a pair of spaced discharge openings in its bottom, a pair of rectangular diagonally ribbed distributor plates supported beneath the discharge openings to rotate about vertical axes, and means adapted to be connected to the power take-off of the tractor for rotating said plates in unison.

Other features include a drive pulley on each plate, a common drive belt having driving connection with each pulley, a drive pulley engaging the drive belt between the first mentioned pulleys and means establishing driving connection between the last mentioned drive pulley and the power take-off of the tractor.

Figures 4, 5:
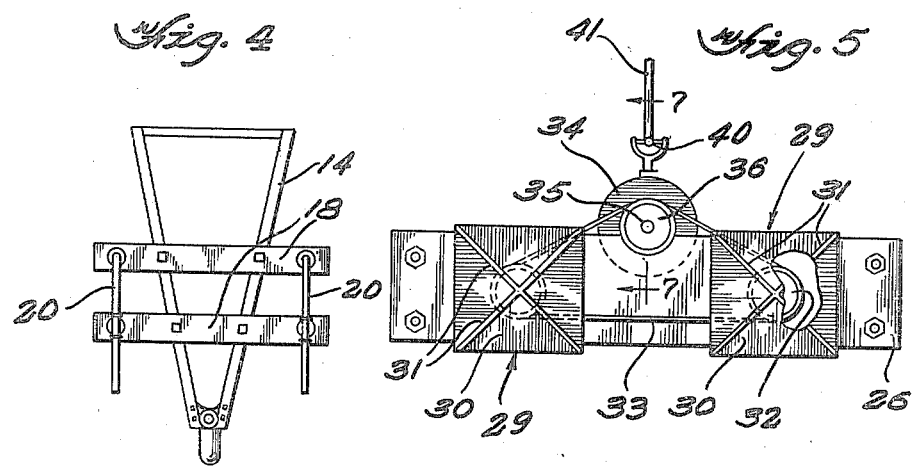

In the drawings:

Figure 1 is a plan view of the rear end of a tractor showing this attachment connected thereto, Figure 2 is a side view of Figure 1, a portion of the traction wheel being broken away to more clearly illustrate details of construction, Figure 3 is a vertical sectional view taken substantially along the line 3—3 of Figure 2, Figure 4 is a plan view of the frame of the device showing the hopper and the seed broadcasting mechanism removed therefrom, Figure 5 is an enlarged horizontal sectional view taken substantially along the line 5—5 of Figure 3.

Figure 6:
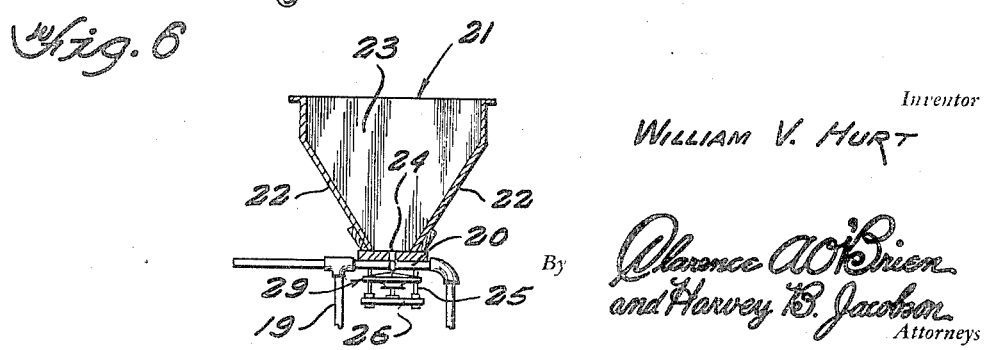

Figure 6 is a vertical sectional view through a portion of the machine showing the hopper in detail, and Figure 7 is an enlarged longitudinal sectional view taken substantially along the line 7—7 of Figure 5.

Referring to the drawings in detail, a tractor designated generally 10 is provided with the usual traction wheels 11 and carries the conventional power take-off shaft 12.

My improved seeder attachment designated generally 13 is supported on a substantially V-shaped frame 14, the side bars of which converge toward a socket 15 supporting the spindle 16 of a suitable caster wheel 17. The forward divergent bars of the frame 14 are connected in any suitable manner to the frame of the tractor 10 so as to hold the frame 14 in substantially horizontal position.

Extending transversely of frame 14 intermediate its ends are spaced parallel bolsters 18 supporting adjacent their ends standards 19, the upper ends of which are joined by horizontally extending side bars 20 upon which a hopper designated generally 21 is supported. This hopper comprises downwardly converging front and rear walls 22 connected at opposite ends by spaced parallel walls 23, and formed in the bottom wall of the hopper are longitudinally spaced slots or discharge openings 24 through which the grain discharges onto the distributor plates, to be more fully hereinafter described.

Suspended from the bottom wall of the hopper on suitable bars 25 is a platform 26 carrying bearings 27, the axes of which align the slots 24. Mounted for rotation in the bearings 27 are vertically extending shafts 28, each of which carries at its upper end a seed distributing plate designated generally 29. Each such plate comprises a rectangular body 30 carrying on its upper face upwardly extending diagonal ribs 31 which intersect at the center of the plate and incline downwardly from their centers, to their outer ends. Attached to the underside of each plate 30 is a pulley 32 over which a drive belt 33 is trained. It will thus be seen that when the belt 33 is driven the plates 29 will rotate in unison about spaced vertical axes directly below the slots 24 of the hopper 21 so as to effectively broadcast the seed deposited from the hopper onto the plates.

Attached to the platform 26 is a gear housing 34 in which a vertically extending shaft 35 is mounted to rotate. The upper end of this shaft 35 carries a pulley 36 which is adapted to have driving connection with the belt 33 as illustrated in Figure 5 and connected to the lower end of the shaft 35 is a gear 37 which has meshing engagement with a pinion 38 carried by horizontally disposed drive shaft 39, the outer end of which is connected through a universal joint 40 to a propeller shaft 41, which in turn is connected to a universal joint 42 to the power take-off shaft 12 of the tractor 10. It will thus be seen that driving connection is established between the power take-off shaft 12 and the disks 29 so as to cause the latter to rotate in unison as the tractor advances and cause seed deposited on the plates from the hopper 21 to be scattered over a wide area in the wake of the tractor.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. In a seeder attachment for a tractor, a frame adapted to be attached to a tractor, a caster wheel supporting the rear end of the frame, a pair of longitudinally spaced bolsters supported on the frame, standards rising from the bolsters near opposite ends thereof, spaced parallel supporting bars at the upper ends of the standards, a hopper supported on said bars, said hopper having a pair of spaced discharge openings in its bottom, a platform suspended from the hopper, a pair of rectangular diagonally ribbed distributor plates rotatably mounted on the platform one beneath each discharge opening, a horizontally disposed plate driving pulley beneath each place, a drive belt having driving connection with each pulley, a horizontally disposed drive pulley engaging the belt between the plate driving pulleys and means establishing driving connection between the drive pulley and the power take-off of a tractor whereby the plates will be rotated in unison.

2. The combination of claim 1, wherein said horizontally disposed plate and said horizontally disposed pulleys rotate in the same plane.

WILLIAM V. HURT.

REFERENCES CITED

The following references are of record in the file of this patent:

UNITED STATES PATENTS

| Number | Name | Date |
|---|---|---|
| 15,104 | Luce | June 10, 1856 |
| 1,033,297 | Barth | July 23, 1912 |
| 1,053,467 | Allen | Feb. 18, 1913 |
| 1,715,325 | Hayden | May 28, 1929 |
| 1,915,325 | Linn | June 27, 1933 |
| 1,971,432 | Smith | Aug. 28, 1934 |
| 2,192,802 | Pound | Mar. 5, 1940 |
| 2,293,977 | Hoffstetter | Aug. 25, 1942 |
| 2,334,376 | Bauer | Nov. 16, 1943 |